C. G. HALL.
DRIFT COMPENSATING DEVICE FOR AIRSHIPS.
APPLICATION FILED JUNE 25, 1919. RENEWED MAY 11, 1921.
1,385,784.
Patented July 26, 1921.
3 SHEETS—SHEET 1.
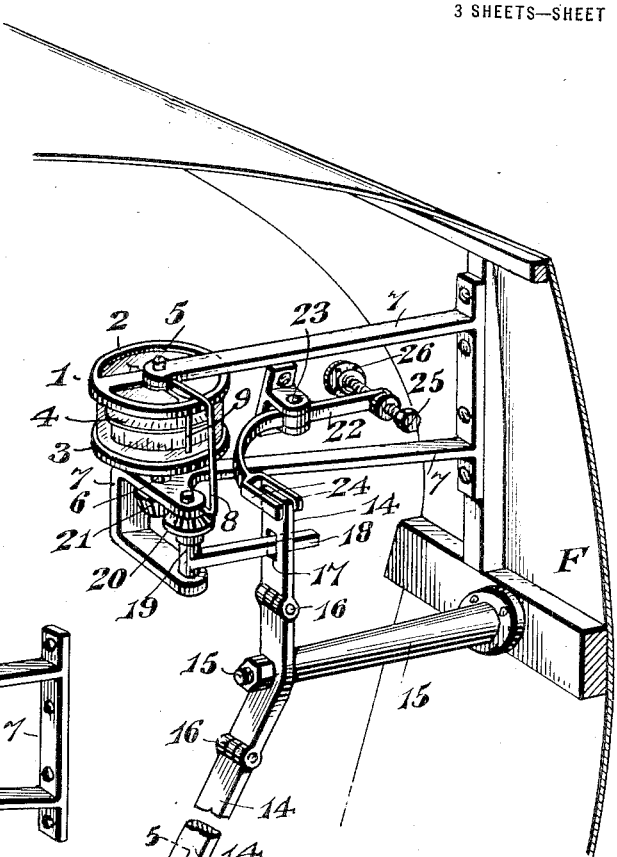
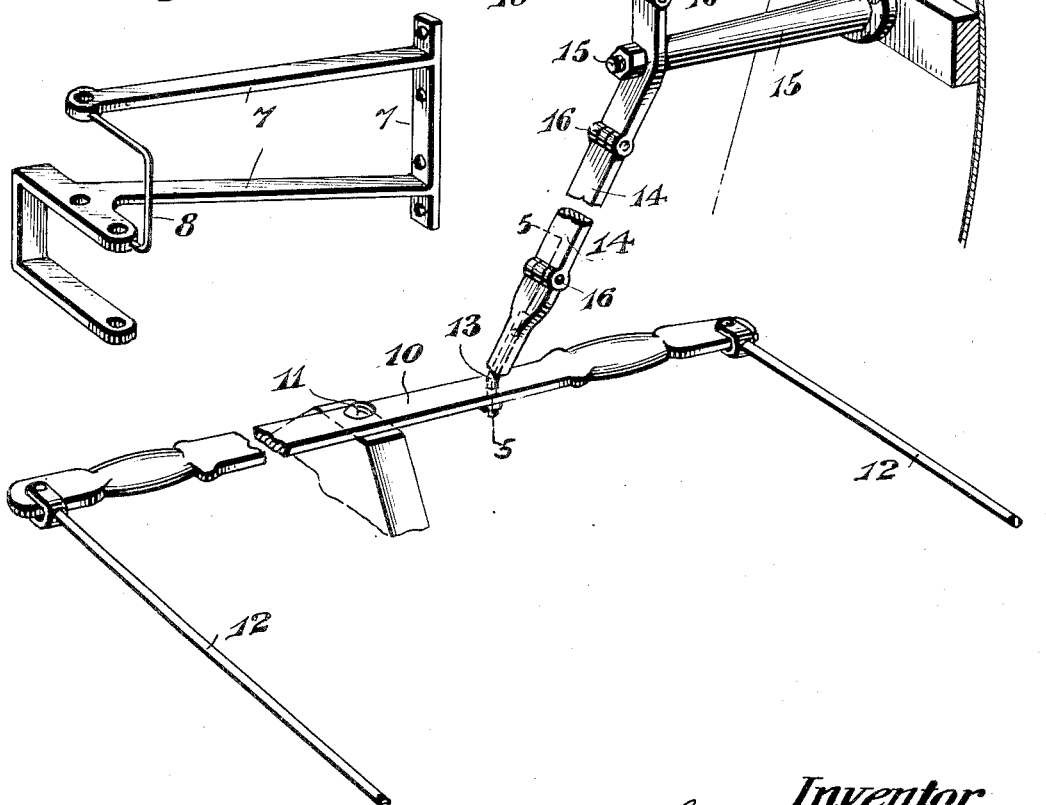
Inventor.
Chalmers G. Hall.

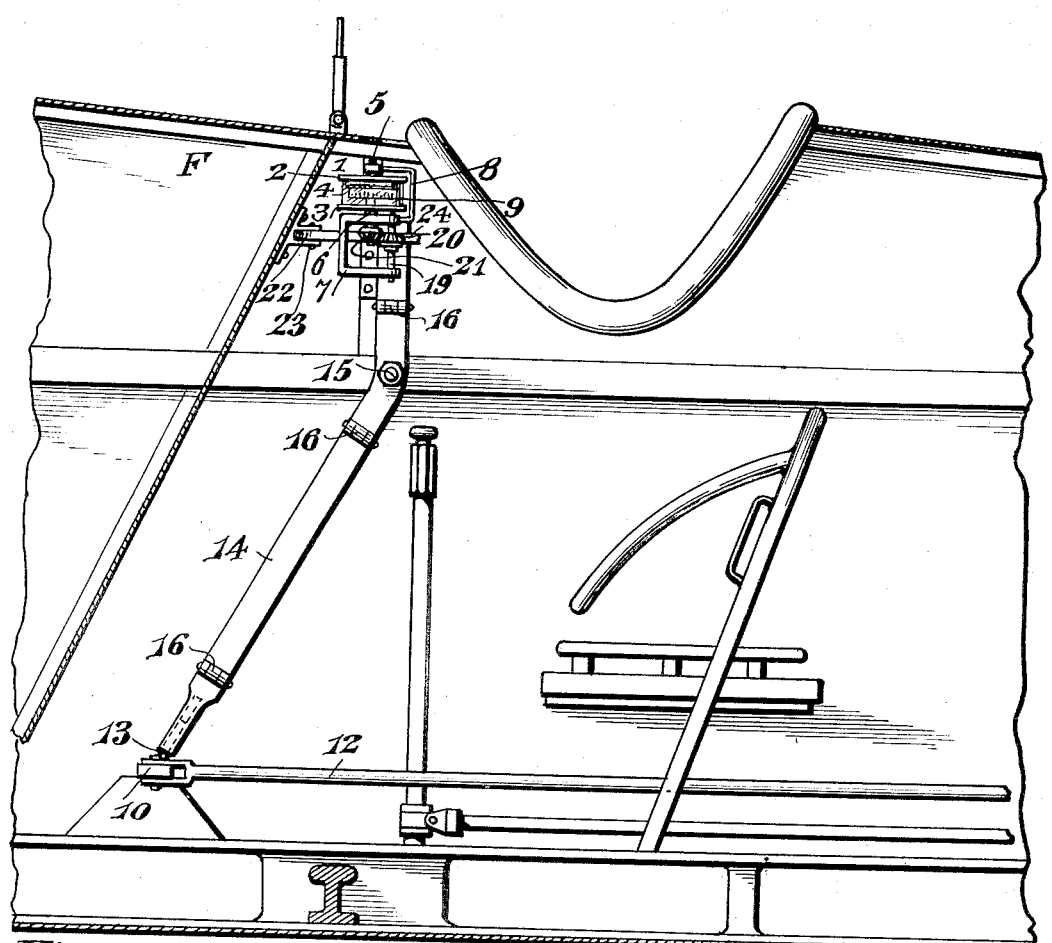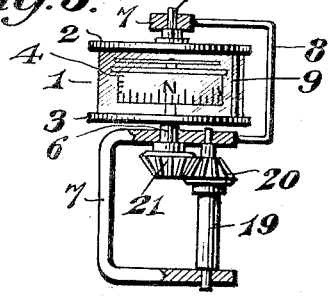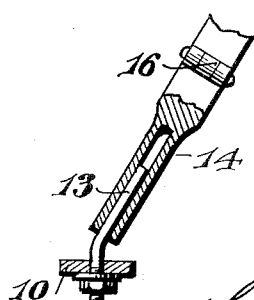

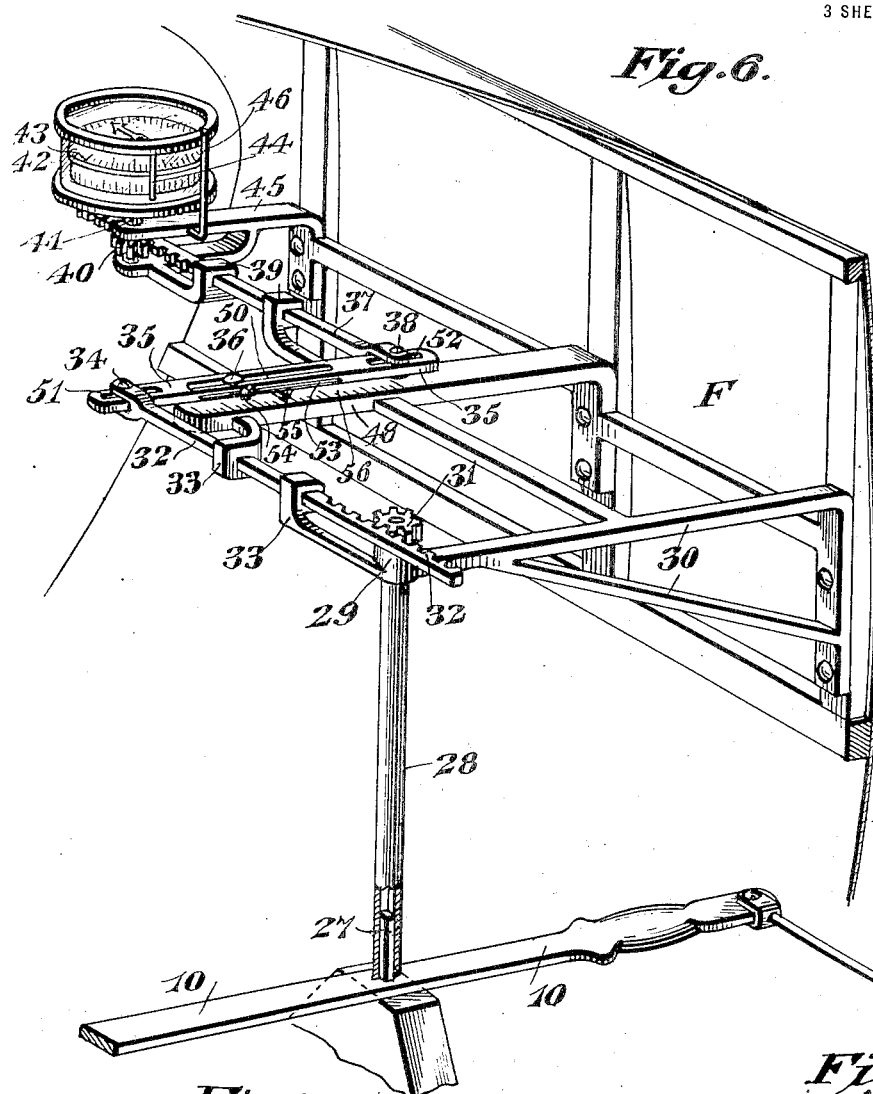
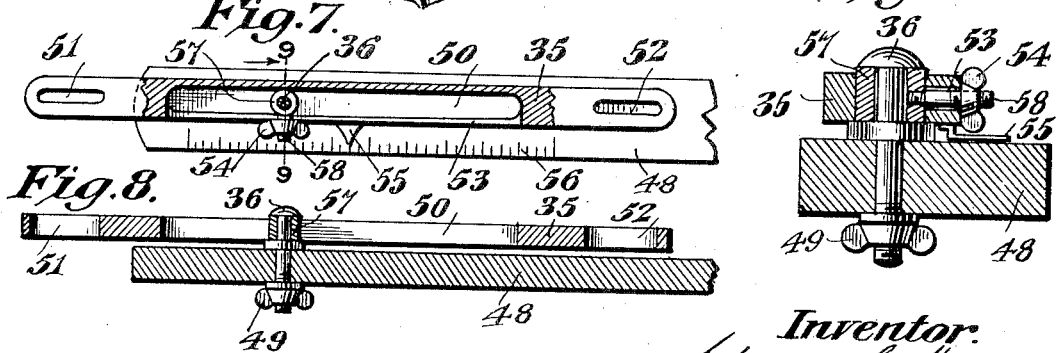

UNITED STATES PATENT OFFICE.

CHALMERS G. HALL, OF WASHINGTON, DISTRICT OF COLUMBIA.

DRIFT-COMPENSATING DEVICE FOR AIRSHIPS.

1,385,784. Specification of Letters Patent. Patented July 26, 1921.

Application filed June 25, 1919, Serial No. 306,631. Renewed May 11, 1921. Serial No. 468,837.

*To all whom it may concern:*

Be it known that I, CHALMERS G. HALL, a citizen of the United States, residing at Washington, in the District of Columbia, have invented certain new and useful Improvements in Drift-Compensating Devices for Airships, of which the following is a specification.

This invention relates to a device intended to be used in connection with the steering mechanism of airplanes, airships, or other vehicles of the air which are propelled by means of propellers, to compensate for the lateral drift of the vehicle when it is flying in a cross-wind.

The invention comprises essentially a movable lubber line contained in an ordinary airplane compass, this lubber line being connected to the mechanism that controls the vertical rudders in such a manner that the lubber line is moved simultaneously with the vertical rudders, and is moved an amount proportional to the movement of the vertical rudders.

The invention also comprises a device for regulating the amount of movement of the lubber line in proportion to the amount of movement of the vertical rudder.

This invention is based on the following principle: When an airplane is flying in a cross-wind, there is, of course, a lateral drift of the airplane due to that cross-wind. There is, however, another force imposed on the airplane when it is flying in a cross-wind, due to the reaction of the propeller on the cross-wind.

Considering an airplane flying in a given direction with a cross-wind at a right-angle to the flight of the airplane, and from the left, and supposing that the propeller is rotating in a given direction, say clockwise, as looked at from the pilot's seat, it will be apparent that the upper propeller blade is moving in the same direction as the cross-wind and offers a comparatively low resistance thereto, while the lower propeller blade is moving in the opposite direction from the cross-wind and offers a comparatively high resistance thereto. The result of this is that there is imposed on the propeller, due to its reaction with the cross-wind, a resultant force, which may be considered as applied on the propeller shaft and at substantially right-angles thereto, in the form of an unbalanced couple, tending, in the case of a tractor airplane, to make the airplane nose away from the wind.

It will be further apparent that this nosing away tendency will be greater, the greater the strength of the cross-wind.

Now, in order to fly a course to a definite objective in a cross-wind, the pilot normally heads into the cross-wind a certain amount, depending on the speed of the cross-wind. The amount that he heads into this cross-wind is usually simply a matter of estimation by the pilot.

With my invention, when the airplane gets into a cross-wind and starts to nose away from the wind, the pilot, in the case of a cross-wind from the left, moves his rudder to the left sufficient to bring the ship back to its true course. Due to the connection between the vertical rudder operating mechanism and the movable lubber-line, this movement of the vertical rudder to bring the ship back to its true course moves the lubber-line toward the same side of the ship as the rudder is moved. Now, in order to still fly on the true compass course, that is to say, if it is desired to fly a due north course, in order to make the movable lubber-line read a true north course, it will be apparent that the airplane must be headed a certain amount to the west of the true north course. The amount of this deviation to the west is proportional to the strength of the cross-wind, and the deviation due to the nosing-away tendency, already described, is proportional to the cross-wind; therefore, the deviation of the plane to the west is proportional to the nosing-away tendency due to the action of the propeller.

The angle in which the airplane, or airship, is deviated from the true course in which direction it is desired to fly, is such as to overcome the lateral drift due to the cross-wind, but exclusive of the nosing away tendency, due to the action of the propeller.

This angle, made by the change of direction of the airplane, or airship, to correct the lateral drift, must be proportional to the angle made by the lubber line with the reference, or zero point, because each angle is the result of a deviation, due to the same cross-wind, though acting differently in each instance.

Now, when the airplane, or airship, is deviated to the left from its true course, after the nosing-away effect, due to the action of the propeller, is first overcome by carrying the vertical rudder to the left, the lubber line will be further moved to the left, due to the need to deflect the vertical rudder through an angle additional to that necessary to overcome the nosing-away effect of the propeller, but the instant the vehicle has been changed in direction sufficiently to overcome the lateral drift, then the vertical rudder is brought back until it occupies a position sufficient to overcome the nosing-away effect of the propeller.

Now, if the angle the lubber line is deflected, when the vehicle is flying its true intended course,—say, due north,—be the same as the angle the vehicle is deflected to overcome the lateral drift, the lubber line will coincide with the true course, or will read due north, while the vehicle will be headed west of north. As the cross-wind increases, or decreases, in its effect on the drift of the vehicle, in order to compensate therefor, the angle of deflection of the vertical rudder, and therefore the lubber line, will have to be increased, or decreased, and inasmuch as it has been presupposed that the angle of deflection of the lubber line shall be equal to the angle of deviation from the true course of the vehicle itself, then, as this angle of deflection of the lubber line increases or decreases, so will the angle of deviation of the vehicle increase by the same amount, because both angles are due to, and vary directly, in proportion to the deviating wind.

An adjusting device, for causing the angle through which the lubber line is revolved to be equal to the angle of deflection of the vehicle from its true course, and proportional to the angle of deflection of the vertical rudder heretofore referred to, is included in the mechanism, and will be hereinafter described.

It should also be understood that the compass is provided with the ordinary fixed lubber-line for use in reading magnetic bearings which are not corrected for drift.

Other objects and advantages will appear as the description proceeds.

In the drawings illustrating certain embodiments of my invention,

Figure 1 is a perspective view of one form of my invention;

Fig. 2 is a side view of the same;

Fig. 3 is a view on an enlarged scale of the compass and associated parts;

Fig. 4 is a view of a bracket used to mount the compass;

Fig. 5 is a view partly in section of the means connecting the joint lever and the rudder bar;

Fig. 6 is a perspective view of another form of my invention;

Fig. 7 is a plan view, shown partly broken away, of the operating lever;

Fig. 8 is a side view of the same; and

Fig. 9 is a section, on an enlarged scale, on the line 9—9 of Fig. 7.

The compass of my invention comprises a casing 1, provided with upper and lower covers 2 and 3, in which casing a compass card 4, of any desired design, is mounted in the usual way, preferably surrounded by oil to dampen the vibrations.

The cover 2 is provided with a trunnion 5, and the cover 3 is provided with a shaft 6 so that the casing is rotatable on a vertical axis. The compass card 4 does not partake of the movement of the compass casing, because of the fact that the only connection between the two is the usual needle point and jewel bearing, which permits relative movement.

The trunnion 5 and shaft 6 are supported in a bracket 7 secured to the fuselage F of the airplane. Mounted between the upper and lower arms of the bracket 7 is the fixed lubber-line 8. Mounted between the upper and lower covers 2 and 3 of the movable compass casing is the movable lubber-line 9. It will be apparent that when the compass casing 1 moves on a vertical axis, the movable lubber-line 9 partakes of this movement, and that the fixed lubber-line 8 does not partake of this movement.

The means for moving the movable lubber-line will now be described. The foot-bar that controls the vertical rudder is indicated at 10, pivoted at 11 in the usual way, and provided with operating cables 12 that are connected to the vertical rudder. A bent arm 13 is attached to the rudder bar 10 at one side of the pivot 11 as shown, and telescopically engages with the lever 14 which is pivoted to and carried by a standard 15 attached to the fuselage F. The lever 14 may be jointed in one or more places, as indicated at 16.

The upper part of the lever 14 is provided with a slot 17 in which loosely engages a lever 18 that is rigid with a shaft 19, which carries a gear 20 that meshes with a gear 21 rigid with the described shaft 6. It will now be apparent that if the left-hand side of the rudder bar 10 is moved forwardly, a movement which will move the vertical rudder to the left, that through the just described connections the movable lubber-line 9 will be moved to the left, and that if the rudder is moved in the opposite direction, the movable lubber-line will be moved to the right. Different airplanes have different flying characteristics and act differently in a crosswind. In order to allow for this, I provide an adjusting device, heretofore referred to, in the connection between the rudder bar and the movable lubber-line to vary the proportional relative movement between the rudder bar and the lubber-line.

This is here shown as a bent lever 22, pivoted at 23, and provided with a fork 24 that loosely engages with the upper end of the lever 14. The other end of the bent lever is provided with a threaded hole in which engages a calibrating screw 25 that is swiveled to a fixed base 26. It will be apparent that as the screw 25 is rotated, the fork 24 will move the upper end of the lever 14 toward and away from the shaft 19, a movement which will give a greater or lesser movement of the arm 18 with a given movement of the lower end of the lever 14, depending upon whether the fork 24 is nearer to or farther from said shaft 19.

The apparatus shown in Fig. 6 will now be described. This modification is a different mechanical means of carrying out the principle of my invention. The rudder bar 10 is pivoted on the squared pin 27, said pin being extended a short distance above the rudder. Engaging over the squared pin 27 is a vertical shaft 28 provided with a squared socket to fit said pin. The upper end of the shaft 28 is mounted in a bearing 29 carried by a bracket 30 mounted on the fuselage F.

The shaft 28 is provided with a spur gear 31, which in turn meshes with the rack 32 mounted in slide-ways 33. Rack 32 is pivoted at 34 to a lever 35, pivoted to move on the pin 36. Another rack bar 37 is pivoted at 38 to the other end of the lever 35 and is mounted in slide-ways 39. The rack bar 37 engages with a spur gear 40 that is mounted on a shaft 41, that in turn carries the movable compass casing 42 provided with the usual compass card 43 and movable lubber-line 44. A standard 45 supports the compass casing and associated parts and also supports a fixed lubber-line 46.

It will now be apparent that as the rudder bar 10 is moved to give the airplane a "right rudder," the movable lubber-line 44 will be moved to the right, and vice versa.

The means for varying the relative proportionate movement between the rudder bar and the movable lubber-line 44 will now be described.

The lever 35 moves about the fixed fulcrum pin 36 that is clamped to the extension 48 of the bracket 30 by the nut 49.

The lever 35 is provided with a longitudinal slot 50, whereby the lever may be set in various relations with respect to the fulcrum pin. The pivots 34 and 38 have a slotted engagement with the lever 35 through the slots 51 and 52, these slots allowing the adjustment of the lever 35 with relation to its fulcrum.

The lever 35 is provided with a connection to the pin 36 that permits of rotating movement between the two, but which allows for longitudinal adjustment. To this end the pin 36 is provided with the loose collar 57, in which collar is mounted the pin 58 that moves in the longitudinal slot 53 of the bar 35. A nut 54 clamps the lever 35 to the pin 58 and so prevents further sliding movement of the lever 35, but does permit the lever 35 to pivot about the pin 36, due to the loose collar 57.

It will be apparent that by setting the lever 35 in relation to its fulcrum 36, a different relative movement between the rack bars 32 and 37 will result, and so will give a relative proportionate movement between the rudder bar 10 and the movable lubber-line 44.

The lever 35 may be provided with a pointer 55 that moves over the graduated scale 56 carried by the extension 48, which calibrations may be in any suitable units.

To briefly summarize the operation of the device: The airplane encounters a cross-wind and starts to nose away from the wind, due to the propeller reaction; this nosing away is proportional to the strength of the cross-wind. In order to correct this, the pilot moves his rudder toward that side from which the cross-wind is coming to head the airplane into the cross-wind. This movement moves the movable lubber-line toward the same side of the airplane as the vertical rudder is moved. In order to keep the airplane on the true compass course, the pilot has to move his rudder far enough toward that side from which the cross-wind is coming so that the movable lubber-line reads the true course. This means that the airplane then is headed into the cross-wind. By virtue of the adjusting screw 25, or the adjustable lever 35, the amount of this heading into the cross-wind may be calibrated for machines with different flying characteristics, and for different flying speeds. The result of this is, that when a pilot encounters a cross-wind, he does not have to make any correction therefor; he simply makes the movable lubber-line read the true compass course that he originally started on, and the extent of this movement, being proportional to the cross-wind, may be readily calibrated so that he heads into the cross-wind an amount sufficient to correct for the drift due to the cross-wind.

While I have illustrated particular embodiments of my invention, it should be understood that the invention may be carried out in other ways, and that accordingly the disclosure be considered in an illustrative sense and not in a limiting sense.

What I claim is:

1. In combination with an airship, a rudder, a compass, a movable lubber line associated with said compass, and means to move said lubber line and said rudder simultaneously.

2. In combination with an airship, a rudder, a compass, a movable lubber line associated with said compass, and means to move said lubber line an amount proportional to the movement of said rudder.

3. In combination with an airship, a rudder, a compass, a movable lubber line associated with said compass, means to move said lubber line an amount proportional to the movement of said rudder, and means to vary the proportionate movement between the lubber line and the rudder.

4. In combination with an airship, a rudder, operating means for said rudder, a compass, a movable lubber line associated with said compass, and means, operated by the said rudder operating means, to move said lubber line.

5. In combination with an airship, a rudder, operating means for said rudder, a compass, a movable lubber line associated with said compass, and means, operated by the said rudder operating means, to move said lubber line toward the same side of the airship as the rudder is moved.

6. In combination with an airship, a rudder, operating means therefor, a compass, a movable lubber line associated with said compass, and means interconnecting said movable lubber line and said rudder so that the two are moved simultaneously.

In testimony whereof I have affixed my signature.

CHALMERS G. HALL.

Witness:
ROBERT H. YOUNG.